United States Patent
Nakahara

(10) Patent No.: US 6,893,688 B2
(45) Date of Patent: May 17, 2005

(54) METHOD AND APPARATUS FOR FABRICATING ELECTRO-OPTICAL DEVICE AND METHOD AND APPARATUS FOR FABRICATING LIQUID CRYSTAL PANEL

(75) Inventor: Hiroki Nakahara, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/946,808

(22) Filed: Sep. 5, 2001

(65) Prior Publication Data

US 2002/0061361 A1 May 23, 2002

(30) Foreign Application Priority Data

| Sep. 6, 2000 | (JP) | 2000-270437 |
|---|---|---|
| Sep. 29, 2000 | (JP) | 2000-300928 |
| Oct. 17, 2000 | (JP) | 2000-317082 |
| Jul. 12, 2001 | (JP) | 2001-212082 |

(51) Int. Cl.[7] .............................. B05D 3/06; B05D 3/12; B01J 19/10; G02F 1/1337
(52) U.S. Cl. ..................... 427/553; 427/560; 427/74; 427/75; 349/123; 349/138
(58) Field of Search .................. 427/553, 554, 427/555, 558, 560, 74, 75, 77, 165, 556, 64; 349/123, 135, 138

(56) References Cited

U.S. PATENT DOCUMENTS

| 4,725,517 A | | 2/1988 | Nakanowatari et al. |
| 4,759,614 A | * | 7/1988 | Yokokura et al. ........ 350/350 S |
| 5,200,238 A | | 4/1993 | McArdle et al. |
| 5,220,446 A | * | 6/1993 | Rho ............................ 359/79 |
| 5,336,535 A | * | 8/1994 | Fukuchi et al. ................ 428/1 |
| 5,607,732 A | | 3/1997 | Miyamoto et al. |
| 5,673,127 A | * | 9/1997 | Takahara et al. .............. 359/40 |
| 5,786,041 A | | 7/1998 | Takenaka et al. |
| 5,907,382 A | * | 5/1999 | Kajiura et al. .............. 349/158 |
| 6,154,265 A | * | 11/2000 | Kamio ........................ 349/122 |
| 6,217,665 B1 | * | 4/2001 | Suzuki ............................ 134/1 |
| 6,236,441 B1 | * | 5/2001 | Aratani et al. .............. 349/141 |
| 6,753,044 B2 | * | 6/2004 | Faris et al. ................... 428/1.1 |
| 2004/0160537 A1 | * | 8/2004 | Okamoto et al. ............. 349/12 |

FOREIGN PATENT DOCUMENTS

| JP | 3-215829 | | 9/1991 |
| JP | 3-254874 | | 11/1991 |
| JP | 4221925 | | 8/1992 |
| JP | 05-034652 | | 2/1993 |
| JP | 5-182945 | | 7/1993 |
| JP | 05-224167 | | 9/1993 |
| JP | 11-092179 | | 4/1999 |
| JP | 02-000147507 A | * | 5/2000 |
| KR | 1999-0082694 | | 11/1999 |
| KR | 2000-0008633 | | 2/2000 |
| TW | 292358 | | 1/1996 |
| TW | 420766 | | 1/2001 |

OTHER PUBLICATIONS

First Office Action in Chinese Patent Application No. 01132640.9 dated Nov. 21, 2003.

* cited by examiner

Primary Examiner—Marianne Padgett
(74) Attorney, Agent, or Firm—Harness, Dickey & Pierce, P.L.C.

(57) ABSTRACT

A method for manufacturing an electro-optical device deposited with an insulating film or alignment layer on the surface of a substrate, the method is characterized by including the step of irradiating ultraviolet radiation onto the surface of the substrate (an ultraviolet radiation irradiating step) and the step of depositing the insulating film or alignment layer on the surface of the substrate irradiated with the ultraviolet radiation (an insulating material coating step or alignment layer coating step).

5 Claims, 7 Drawing Sheets

FIG. 6
(a)
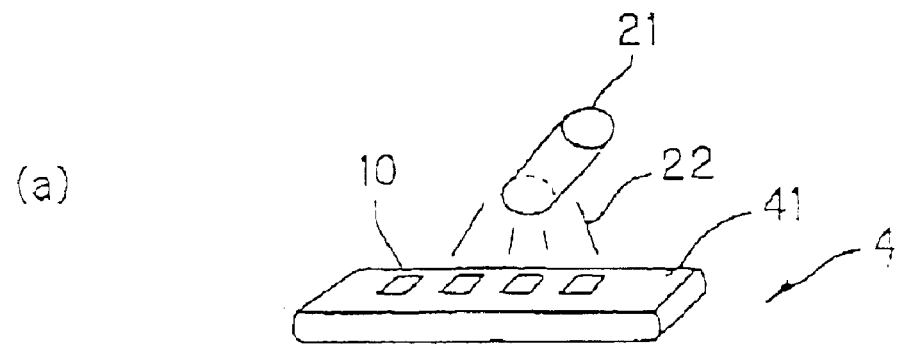
(b)
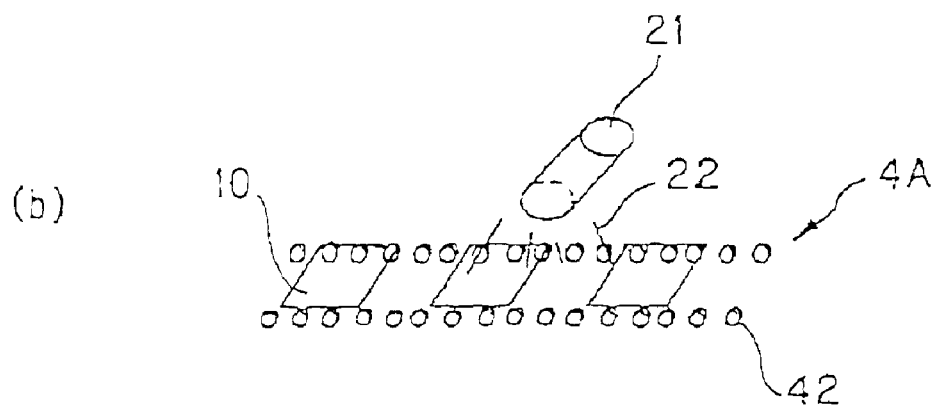
(c)
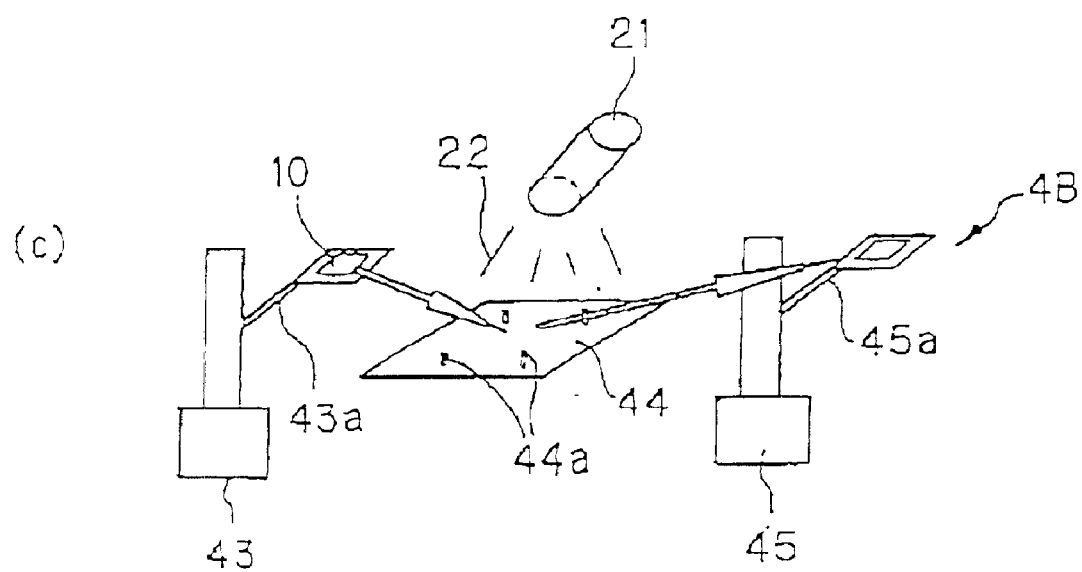

METHOD AND APPARATUS FOR FABRICATING ELECTRO-OPTICAL DEVICE AND METHOD AND APPARATUS FOR FABRICATING LIQUID CRYSTAL PANEL

BACKGROUND OF THE INVENTION

1. Technical Field of the Invention

The present invention relates to a method and apparatus for manufacturing an electro-optical device formed with an insulating film or alignment layer on a substrate, and a method and apparatus for manufacturing a liquid crystal panel, more particularly, a method and apparatus for manufacturing an electro-optical device capable of uniformly depositing the insulating film or alignment layer, and a method and apparatus for manufacturing a liquid crystal panel capable of efficiently cleaning the alignment layer.

2. Description of the Related Art

Currently, in electronic devices such as mobile telephones and mobile electronic terminals, liquid crystal devices are widely used for displaying information such as characters, numerals and icons. Such liquid crystal devices are generally provided with a liquid crystal panel sealed with liquid crystals between a pair of liquid crystal substrates formed with electrodes on the inner surfaces, and have a configuration where a voltage is applied to the liquid crystals sealed inside the liquid crystal panel with the voltage controlled and thereby the alignment of the liquid crystals is controlled to modulate light incident into the liquid crystals.

In such liquid crystal devices, in addition to the above-mentioned electrodes for applying a voltage to liquid crystals, an insulating film for ensuring insulation between two layers and an alignment layer for forming the alignment of liquid crystals (aligning liquid crystals in a predetermined direction) are deposited on the inner outside face (surface) of the liquid crystal substrates. In general, inorganic materials such as metal oxide and the like are used as materials for the insulating film, and organic materials such as polyimide and the like are used as the alignment layer.

Additionally, to the surface of the alignment layer described above, a so-called rubbing process(for example, process of rubbing with cloth etc.) is applied. It is considered that the rubbing process forms fine grooves on the surface of the alignment layer, liquid crystals are aligned along the direction of the grooves and thereby a predetermined alignment is achieved.

However, when the insulating film or alignment layer is directly deposited on the surface of a glass substrate, there has been a problem that the inorganic materials such as metal oxide and the like for the insulating film material or organic material such as polyimide and the like for the alignment layer material has a low wettability to the glass substrate and it is difficult to uniformly deposit the insulating film or alignment layer on the surface of the glass substrate.

Additionally, during the rubbing process, dust or dirt such as a fiber of the cloth or the like can be attached on the surface of the alignment layer. Such foreign matters (dusts or dirt) on the surface of the alignment layer are removed by ultrasonic cleaning with pure water after the rubbing process. However, the alignment layer has a hydrophobic property and thus tends to repel water. There is the case where the foreign matters are gathered in air bubbles on the alignment layer, and sometimes remain inside the liquid crystal panel unremoved. There has been a problem that the foreign matters which thus remain cause defects regarding the alignment property of liquid crystals.

The purpose of the invention is to provide a method and an apparatus for manufacturing an electro-optical device capable of uniformly depositing an insulating film or alignment layer on the surface of the substrate, and a method and an apparatus for manufacturing a liquid crystal panel capable of efficiently cleaning the alignment layer.

SUMMARY OF THE INVENTION

The method for manufacturing the electro-optical device of the invention is a method for manufacturing an electro-optical device formed with an insulating film or alignment layer on the surface of a substrate, the method is characterized by including the step of irradiating ultraviolet radiation onto the surface of the substrate and the step of depositing the insulating film or alignment layer on the surface of the aforesaid substrate irradiated with the ultraviolet ray.

According to this method for manufacturing the electro-optical device, the ultraviolet radiation are irradiated onto the surface of the substrate before the insulating film or alignment layer is deposited on the surface of the substrate and thus the wettability of insulating film materials or alignment layer materials to the substrate can be enhanced. Accordingly, the uniformity of the insulating film or alignment layer to be deposited on the surface of the substrate can be improved.

In this case, the method may include the step of cleaning the surface of the aforesaid substrate before the step of irradiating the ultraviolet radiation onto the surface of the aforesaid substrate.

In this manner, the surface of the substrate is cleaned before the ultraviolet radiation are irradiated and thereby the insulating film or alignment layer can be deposited on the surface of the substrate right after being cleaned. Thus, the effect of ultraviolet radiation irradiation can be enhanced.

The method for manufacturing the electro-optical device of the invention may be characterized by including the step of depositing a coupling layer on the surface of a substrate, the step of irradiating ultraviolet radiation onto the surface of the aforesaid coupling layer deposited and the step of depositing an insulating film or alignment layer on the aforesaid coupling layer irradiated with the ultraviolet radiation.

According to this method for manufacturing the electro-optical device, the ultraviolet radiation are irradiated onto the surface of the coupling layer deposited on the surface of the substrate before the insulating film or alignment layer is deposited and thus the wettability of the insulating film materials or alignment layer materials to the coupling layer can be enhanced. Accordingly, the uniformity of the insulating film or alignment layer to be deposited on the surface of the substrate can be improved.

The method may include the step of cleaning the surface of the aforementioned substrate before the step of depositing the coupling layer on the surface of the aforementioned substrate.

In this manner, the coupling layer is deposited after the substrate has been cleaned and the ultraviolet radiation are further irradiated. Therefore, the insulating film or alignment layer can be deposited right after the ultraviolet radiation have been irradiated onto the coupling layer. Accordingly, the effect of ultraviolet radiation irradiation can be enhanced.

As materials for the aforesaid substrate, glass relatively having resistance to ultraviolet radiation irradiation is preferable. Additionally, as the insulating film to be deposited thereon, an inorganic oxide film is preferable.

Similarly, it is preferable that the aforesaid substrate is glass and the aforementioned alignment layer is a polyimide film. Also in this case, the wettability of the alignment layer material to the substrate is inferior but the wettability can be enhanced by ultraviolet radiation irradiation. Thus, the uniformity of the alignment layer can be improved effectively.

Furthermore, the apparatus for manufacturing the electro-optical device of the invention is characterized by comprising a cleaning part for cleaning the surface of a substrate with ultrasonic waves, ultraviolet radiation irradiating part for irradiating ultraviolet radiation onto the surface of the aforesaid substrate ultrasonically-cleaned in the aforementioned cleaning part and a transfer unit for transferring the aforesaid substrate so as to sequentially pass through the aforementioned cleaning part and the aforementioned ultraviolet radiation irradiating part.

According to this apparatus for manufacturing the electro-optical device, cleaning the substrate that is carried by the transfer unit and ultraviolet radiation irradiation onto the substrate are sequentially conducted and the substrate flow is not hindered. Thus, the manufacture efficiency can be enhanced. Additionally, the surface of the substrate is activated by ultraviolet ray irradiation and thus the wettability of the material for the layer to be deposited on the surface of the substrate at the subsequent step to the substrate can be enhanced. Accordingly, the uniformity of the layer to be deposited at the subsequent step can be improved.

In this case, the apparatus may be provided with an insulating film or alignment layer depositing part for depositing the insulating film or alignment layer on the surface of the aforesaid substrate irradiated with the ultraviolet ray in the aforementioned ultraviolet ray irradiating part.

In such a configuration, ultraviolet ray irradiation can enhance the wettability of the insulating film material or alignment layer material to the substrate and thus the uniformity of the insulating film or alignment layer can be improved.

Preferably, the aforesaid substrate is glass and the aforementioned insulating film is the inorganic oxide film, or the aforesaid substrate is glass and the aforementioned alignment layer is the polyimide film, which is similar to the case of the method for manufacturing the electro-optical device described earlier.

The method for manufacturing the liquid crystal panel of the invention is a method for manufacturing a liquid crystal panel comprising liquid crystals sealed between a pair of substrates and an alignment layer deposited on the aforesaid substrates, the method is characterized by including a rubbing step of applying a rubbing process to the alignment layer deposited on the substrates, an ultraviolet ray irradiating step of irradiating an ultraviolet ray onto the aforementioned alignment layer applied to the aforesaid rubbing process and a cleaning step of cleaning the aforementioned alignment layer irradiated with the aforesaid ultraviolet ray.

According to this method for manufacturing the liquid crystal panel, the ultraviolet ray is irradiated onto the alignment layer before the cleaning step of the alignment layer and thus the wettability of the alignment layer at the cleaning step can be improved. Therefore, bubble generation at the cleaning step is suppressed and the alignment layer can be cleaned efficiently.

In this case, a wavelength of the ultraviolet ray at the aforesaid ultraviolet ray irradiating step is set to about 254 nm and an irradiation amount thereof is set to about 900 mJ/cm$^2$ or greater. Alternatively, a wavelength of the ultraviolet ray at the aforesaid ultraviolet ray irradiating step is set to about 365 nm, an irradiation amount thereof is set to about 3000 mJ/cm$^2$ or greater, and a period of time after ultraviolet ray irradiation at the aforementioned ultraviolet ray irradiating step until cleaning at the aforesaid cleaning step may be set to within about 60 minutes.

In such a configuration, the effect of ultraviolet ray irradiation to cleaning can be exerted sufficiently.

Additionally, a wavelength of the ultraviolet ray at the aforesaid ultraviolet ray irradiating step is set to about 254 nm and an irradiation amount thereof is set to about 150 mJ/cm$^2$ or greater. Alternatively, a wavelength of the ultraviolet ray at the aforesaid ultraviolet ray irradiating step is set to about 365 nm, an irradiation amount thereof is set to about 500 mJ/cm$^2$ or greater, and a period of time after ultraviolet ray irradiation at the aforementioned ultraviolet ray irradiating step until cleaning at the aforesaid cleaning step may be set to within about five minutes.

In such a configuration, the effect of ultraviolet ray irradiation to cleaning can be exerted sufficiently.

Furthermore, an ultraviolet ray irradiation amount at the aforementioned ultraviolet radiation irradiating step may be increased as a period of time after ultraviolet ray irradiation at the aforementioned ultraviolet ray irradiating step until cleaning at the aforesaid cleaning step is prolonged.

In such a configuration, the ultraviolet ray irradiation amount can be set to a proper value in accordance with the time after ultraviolet ray irradiation until cleaning and thus the effect of ultraviolet ray irradiation to cleaning can be exerted efficiently without unnecessarily increasing the ultraviolet ray irradiation amount.

The apparatus for manufacturing the liquid crystal panel of the invention is an apparatus for manufacturing a liquid crystal panel comprising liquid crystals sealed between a pair of substrates and an alignment layer formed on the aforesaid substrates, the apparatus is characterized by comprising a rubbing part for applying a rubbing process to the aforesaid alignment layer deposited on the aforementioned substrates, an ultraviolet ray irradiating part for irradiating an ultraviolet ray onto the aforesaid alignment layer subjected to the rubbing process in the aforesaid rubbing part and a transfer unit for transferring substrates deposited with the aforesaid alignment layer (alignment layer deposited substrates) from the aforesaid rubbing part to the aforementioned ultraviolet ray irradiating part and discharging the aforesaid alignment layer deposited substrates irradiated with the ultraviolet ray in the aforementioned ultraviolet ray irradiating part for cleaning.

According to this apparatus for manufacturing the liquid crystal panel, the ultraviolet ray is irradiated onto the alignment layer before the substrates deposited with the alignment layer (alignment layer deposited substrates) are cleaned and thus the wettability of the alignment layer in cleaning can be improved. Therefore, bubble generation in cleaning is suppressed and the alignment layer can be cleaned efficiently. Additionally, the rubbing part is directly joined to the ultraviolet ray irradiating part and thereby the ultraviolet ray can be irradiated without hindering the substrate flow. Furthermore, the shorter the time after ultraviolet ray irradiation until cleaning is performed, the more noticeable the effect of ultraviolet ray irradiation is. Therefore, the time after ultraviolet ray irradiation until cleaning is preferably within about 60 minutes.

In this case, the apparatus is further provided with a cleaning part for cleaning the aforesaid alignment layer deposited substrates irradiated with the ultraviolet ray through the aforementioned ultraviolet ray irradiating part and the aforementioned transfer unit may have a configuration of transferring the aforesaid alignment layer deposited substrates along a transfer path from the aforementioned rubbing part to the aforesaid cleaning part and discharging the aforesaid alignment layer deposited substrates.

In such a configuration, the ultraviolet ray is irradiated onto the alignment layer right before being cleaned in the cleaning part. Thus, the wettability of the alignment layer in the cleaning part is improved, bubble generation in the cleaning part is suppressed and the alignment layer can be cleaned efficiently. Additionally, the rubbing part, the ultraviolet ray irradiating part and the cleaning part are serially joined and thereby ultraviolet ray irradiation and substrate cleaning can be conducted without hindering the substrate flow.

Furthermore, preferably, the apparatus is such that a wavelength of the ultraviolet ray in the aforesaid ultraviolet ray irradiating part is about 254 nm and an irradiation amount thereof is about 900 mJ/cm$^2$ or greater, or a wavelength of the ultraviolet ray in the aforesaid ultraviolet ray irradiating part is about 365 nm, an irradiation amount thereof is about 3000 mJ/cm$^2$ or greater, and a period of time after ultraviolet ray irradiation in the aforementioned ultraviolet ray irradiating part until cleaning in the aforesaid cleaning part is within about 60 minutes.

In such a configuration, the effect of ultraviolet ray irradiation to cleaning can be exerted sufficiently.

Moreover, preferably, the apparatus is such that a wavelength of the ultraviolet ray in the aforesaid ultraviolet ray irradiating part is about 254 nm and an irradiation amount thereof is about 150 mJ/cm$^2$ or greater, or a wavelength of the ultraviolet ray in the aforesaid ultraviolet ray irradiating part is about 365 nm, an irradiation amount thereof is about 500 mJ/cm$^2$ or greater, and a period of time after ultraviolet ray irradiation in the aforementioned ultraviolet ray irradiating part until cleaning in the aforesaid cleaning part is within about five minutes.

In such a configuration, the effect of ultraviolet ray irradiation to cleaning can be exerted sufficiently.

Besides, more preferably, the apparatus further comprises a control part for increasing an ultraviolet ray irradiation amount in the aforementioned ultraviolet ray irradiating part as a period of time after ultraviolet ray irradiation in the aforementioned ultraviolet ray irradiating part until cleaning in the aforesaid cleaning part is prolonged.

In such a configuration, the ultraviolet ray irradiation amount can properly be controlled in accordance with the time after ultraviolet ray irradiation until cleaning and thus the effect of ultraviolet ray irradiation to cleaning can be exerted efficiently without unnecessarily increasing the ultraviolet ray irradiation amount.

BRIEF DESCRIPTION OF THE DRAWINGS

FIGS. 6(a)–6(c) schematically show the transfer units for bringing in the substrate passed through the rubbing part toward the UV irradiating part and transferring the substrate inside the UV irradiating part in one embodiment of the apparatus for manufacturing the liquid crystal panel of the invention;

DETAILED DESCRIPTION OF THE PREFERRED EMBODIMENT

Hereafter, one embodiment of the method for manufacturing the electro-optical device of the invention will be specifically described with reference to FIGS. 1 to 3.

Figure 1:
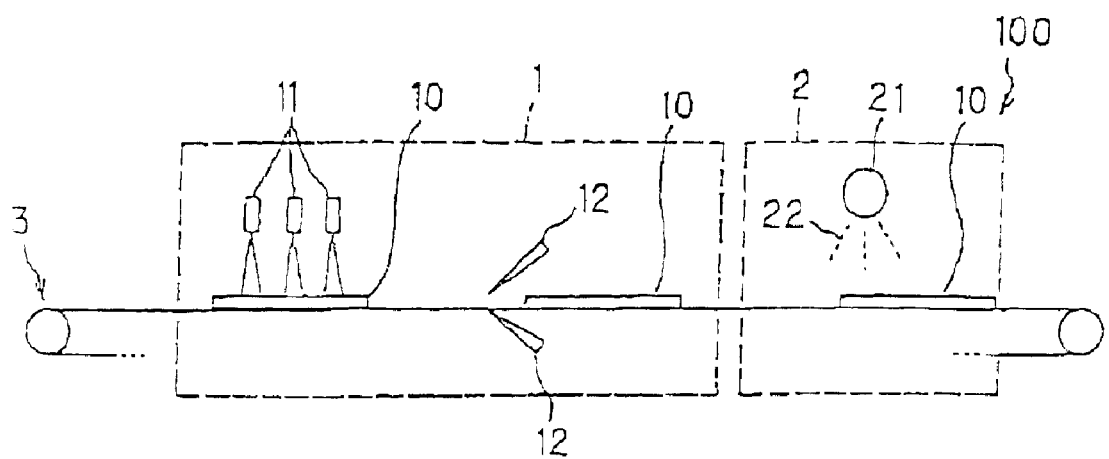
FIG. 1 is an illustration schematically showing one embodiment of the apparatus for manufacturing the electro-optical device of the invention.

FIG. 1 shows an illustration schematically showing the embodiment of the apparatus for manufacturing the electro-optical device of the invention. As shown in FIG. 1, a manufacturing apparatus 100 of the electro-optical device used for the embodiment comprises a cleaning part 1 for cleaning the surface of a liquid crystal substrate 10 with ultrasonic waves, ultraviolet radiation irradiating part 2 for irradiating ultraviolet radiation 22 onto the surface of the liquid crystal substrate 10 cleaned with the ultrasonic waves or pure water in the cleaning part 1 and a transfer unit 3 for transferring the liquid crystal substrate 10 so as to sequentially pass through the cleaning part 1 and the ultraviolet radiation irradiating part 2.

In the cleaning part 1, a plurality of nozzles 11 for ejecting pure water toward the liquid crystal substrate 10 carried by the transfer unit 3 and air-knife nozzles 12 for spraying air toward the liquid crystal substrate 10 are provided. The nozzles 11 are provided with a vibration plate (not shown) for giving ultrasonic vibrations to pure water. Pure water is ejected from the nozzles 11 as the vibration palate is vibrated and thereby ultrasonic-vibrated water mixed with pure water and air can be ejected from the nozzles 11 to the liquid crystal substrate 10 in full momentum. Air is sprayed from the air-knife nozzles 12 at high speed toward the liquid crystal substrate 10. Thereby, pure water on the liquid crystal substrate 10 can be blown off and removed.

In the ultraviolet radiation irradiating part 2, an ultraviolet lamp 21 for irradiating the ultraviolet radiation 22 toward the liquid crystal substrate 10 carried by the transfer unit 3 is provided. The ultraviolet radiation 22 are irradiated onto the liquid crystal substrate 10 and thereby the wettablity of the alignment layer material or insulating film material to the surface of the liquid crystal substrate 10 can be improved.

As the transfer unit 3, the embodiment illustrates the case of using a belt conveyer type transfer unit as shown in FIG. 1. However, in addition to this, a roller conveyer type transfer unit or an apparatus that transfers the liquid crystal substrate 10 by using a robot may be used.

Figure 2:
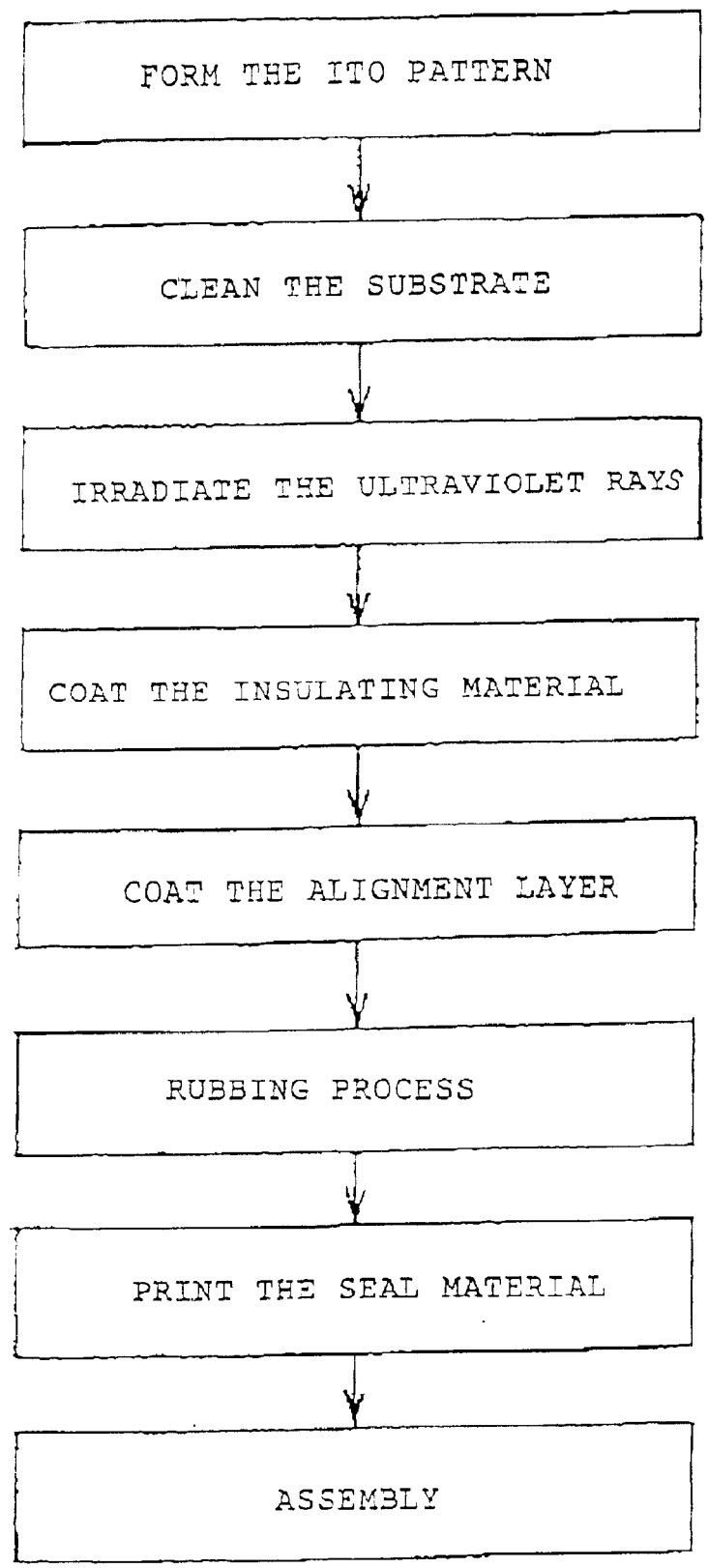
FIG. 2 is a process diagram schematically illustrating one embodiment of the method for manufacturing the electro-optical device of the invention.

FIG. 2 shows process diagram schematically illustrating one embodiment of the method for manufacturing the electro-optical device of the invention. Additionally, the embodiment illustrates the case of using a passive matrix liquid crystal device as the electro-optical device.

As shown in FIG. 2 with reference to FIG. 1, before the substrate is cleaned in the manufacturing apparatus 100 of the electro-optical device (before a substrate cleaning step), an ITO (indium tin oxide) electrode pattern is formed on the liquid crystal substrate 10 (an ITO pattern forming step).

The liquid crystal substrate 10 is then brought in the manufacturing apparatus 100 of the electro-optical device and the liquid crystal substrate 10 carried by the transfer unit 3 sequentially passes through the cleaning part 1 and the ultraviolet radiation irradiating part 2 (the substrate cleaning step and an ultraviolet radiation irradiating step). The surface of the liquid crystal substrate 10 brought out of the manufacturing apparatus 100 of the electro-optical device has an enhanced wettability to the insulating film material by cleaning and ultraviolet radiation irradiation.

Subsequently, an insulating material is coated on the surface of the liquid crystal substrate 10 (an insulating material coating step). As the insulating material, inorganic oxide films such as $SiO_2$, $ZnO$, $ZrO_2$, $TiO_2$, and $Sb_2O_5$ can be used. As a coating method of the insulating material, typical methods such as screen printing and relief printing can be used.

After the insulating film is deposited, an alignment layer is coated on the insulating film (an alignment layer coating step). As the alignment layer material, polyimide etc. can be used. Then, a rubbing process is applied to the alignment layer (a rubbing process step). The rubbing process is a process for forming fine grooves by rubbing the surface of the alignment layer in one direction with cotton cloth or the like. Thereby, the alignment direction of liquid crystals sealed in the liquid crystal device (panel) can be controlled.

Subsequently, a seal material for attaching a pair of substrates constituting the liquid crystal device (panel) is formed (a seal material printing step).

Then, the pair of substrates are attached with the seal material and liquid crystals are injected between the pair of substrates to complete the liquid crystal panel (an assembling step).

In the embodiment mentioned above, the example where the insulating film material coating step is arranged after the ultraviolet ray irradiating step was shown, but the same effect can be obtained by the case where the alignment layer coating step is arranged after the ultraviolet radiation irradiating step.

Figure 3:
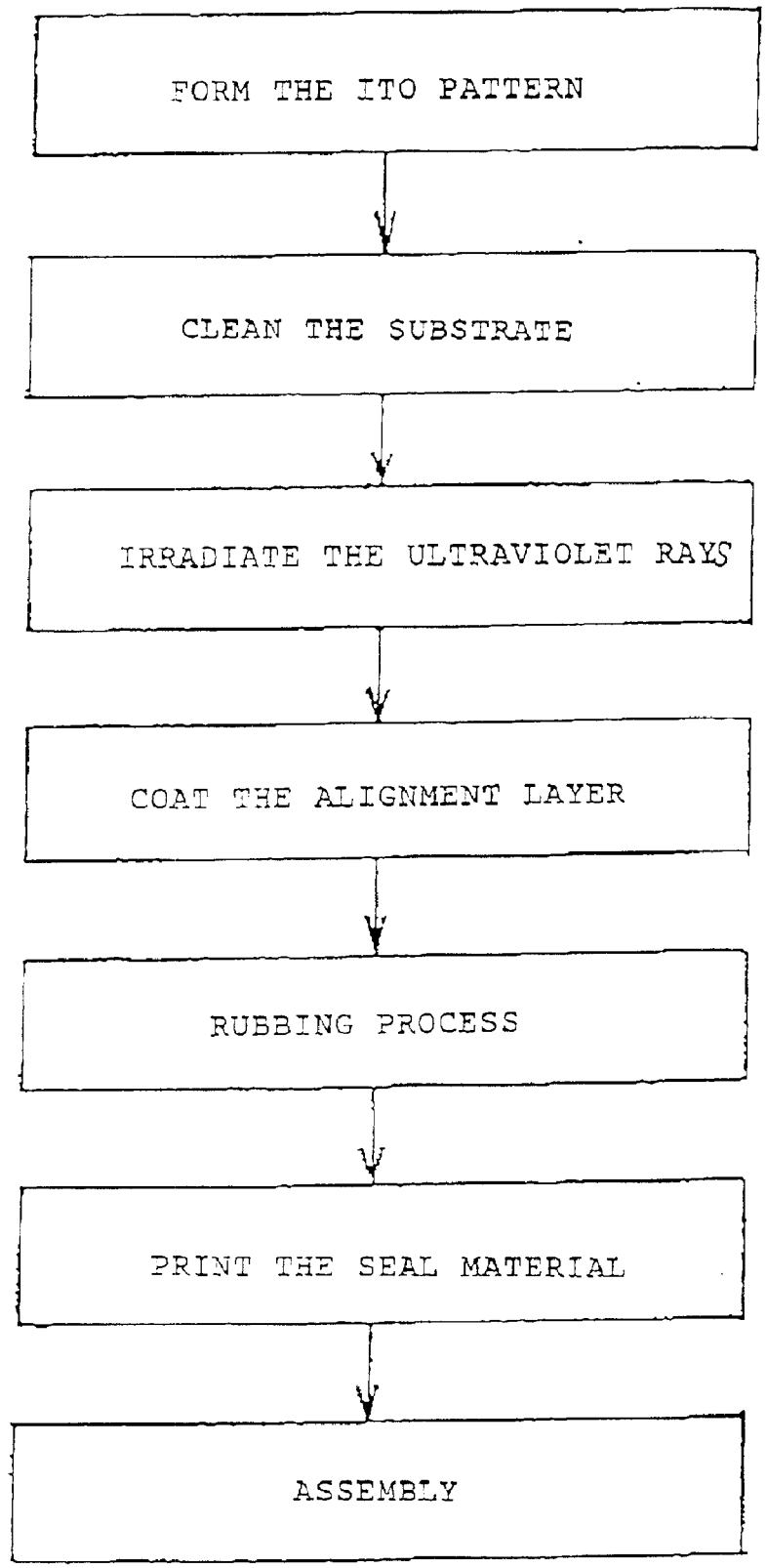
FIG. 3 is a process diagram schematically illustrating another embodiment of the method for manufacturing the electro-optical device of the invention.

FIG. 3 shows a process diagram schematically illustrating another embodiment of the method for manufacturing the electro-optical device of the invention. Additionally, the embodiment also illustrates the case of using the passive matrix liquid crystal device as the electro-optical device.

In the embodiment, the alignment layer coating step is arranged after the ultraviolet radiation irradiating step, not through the insulating film material coating step. In this manner, the ultraviolet radiation are irradiated before the alignment layer is deposited and thereby the alignment layer can be deposited uniformly.

In this case, as the alignment layer material, organic polymer based alignment layer materials (a polyimide-based varnish is preferable among them) and the like can be used.

The glass substrate originally has a poor wettability to the alignment layer material such as polyimide, but the ultraviolet radiation irradiation enhances the wettability to the insulating material on the surface of the liquid crystal substrate in the embodiment as described above. Thus, the alignment layer can be deposited uniformly.

In the embodiment, when a period of time after ultraviolet radiation irradiation until the alignment layer is coated is prolonged, the effect of ultraviolet radiation irradiation is weakened. Therefore, the time is preferably within 30 minutes. Additionally, the intensity of the ultraviolet radiation is preferably 200 mJ/cm$^2$ or greater at a wavelength of 254 nm.

In the embodiment, the case where the manufacturing apparatus 100 of the electro-optical device is used to fabricate the liquid crystal device was exemplified, but the method for manufacturing the electro-optical device of the invention is not limited to the case of using the apparatus described above. Furthermore, the method for manufacturing the electro-optical device of the invention is not limited to the application of the passive matrix liquid crystal device, which can be applied to the case of manufacturing all the electro-optical devices such as plasma display devices and electro luminescent display devices, in addition to all the liquid crystal devices including active matrix liquid crystal devices.

Hereafter, one embodiment of the apparatus for manufacturing the liquid crystal panel of the invention will be described with reference to FIGS. 4 to 7.

Figure 4:
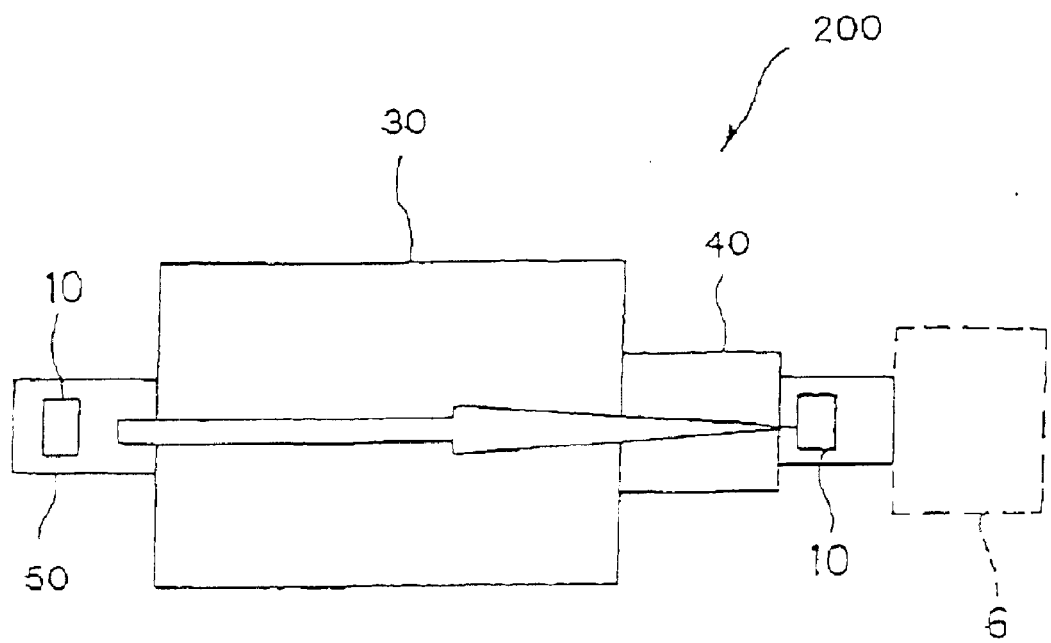
FIG. 4 is an illustration schematically showing one embodiment of the apparatus for manufacturing the liquid crystal panel of the invention.

FIG. 4 shows an illustration schematically showing one embodiment of the apparatus for manufacturing the liquid crystal panel of the invention. Additionally, FIG. 4 shows a single-substrate processing type apparatus for manufacturing the liquid crystal panel as a liquid crystal panel manufacturing apparatus 200.

Figure 5:
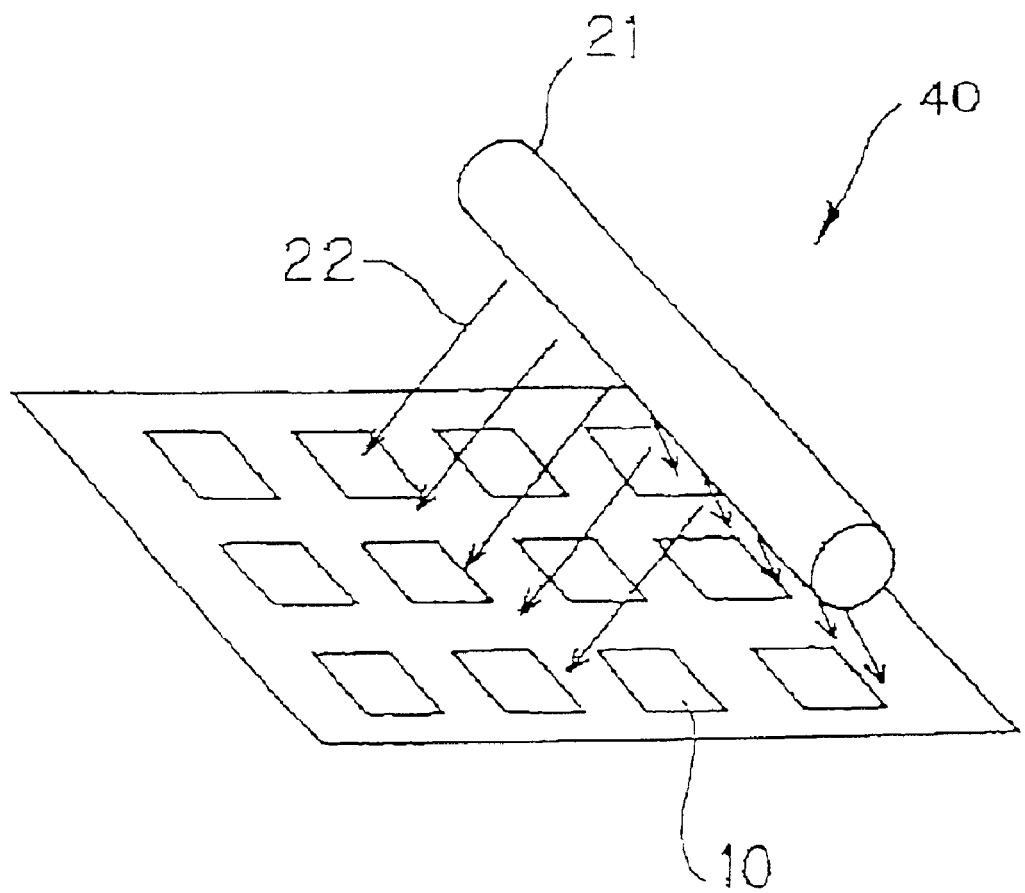
FIG. 5 is an illustration schematically showing one example of the UV irradiating part in one embodiment of the apparatus for manufacturing the liquid crystal panel of the invention.

FIG. 5 shows an illustration showing one example of a UV irradiating part in the embodiment of the liquid crystal panel manufacturing apparatus of the invention.

As shown in FIG. 4, the liquid crystal panel manufacturing apparatus 200 comprises a rubbing part 30 for applying a rubbing process to the alignment layer deposited on a substrate (mother substrate) 10 where a plurality of panel substrates are arranged and a UV irradiating part 40 for irradiating the ultraviolet radiation onto the side of the substrate 10 where the alignment layer has been deposited, with the substrate having passed through the rubbing part 30. Furthermore, a bringing-in part 50 for receiving the substrate 10 is disposed on the near side of the rubbing part 30. Besides, a numeral 6 denotes a cleaning part.

As shown in FIG. 5, the UV irradiating part 40 is provided with a UV lamp 21 for irradiating ultraviolet radiation 22 toward the substrates 10 carried in a state that they are arranged with a constant spacing.

FIG. 6 shows illustrations schematically showing transfer units for bringing in the substrates 10 that have passed through the rubbing part 30 toward the UV irradiating part 40 and transferring the substrates 10 inside the UV irradiating part 40 (see FIG. 4); FIG. 6(a) shows a belt conveyor type transfer unit 4 and FIG. 6(b) shows a roller conveyer type transfer unit 4A.

As shown in FIG. 6(a), in the belt conveyor type transfer unit 4, the substrates 10 are placed and carried on a belt 41 under the UV lamp 21. The substrates 10 are carried with the side formed with the alignment layer up. The belt 41 is driven by a drive mechanism (not shown).

As shown in FIG. 6(b), in the roller conveyer type transfer unit 4A, a plurality of rollers 42 are disposed along the transfer path of the substrates 10. A drive mechanism (not shown) rotates the rollers 42 and thereby the substrates 10 placed on the rollers 42 are carried under the UV lamp 21. The substrates 10 are carried with the side formed with the alignment layer up.

FIG. 6(c) shows the case where a single-substrate irradiation furnace with robots is used as the transfer unit. In this transfer unit 4B, a robot 43 places the substrates 10 on a stage 44 one by one and the ultraviolet radiation 22 are irradiated onto the substrate 10 on the stage 44. The substrate 10 is placed with the side formed with the alignment layer up. After ultraviolet radiation irradiation, a robot 45 brings the substrate 10 out of the stage 44. The stage 44 is provided with lifting pins 44a for driving the substrate 10 vertically. The lifting pins 44a lift the substrate 10 and thereby spacing where a hand 43a of the robot 43 and a hand 45a of the robot 45 are inserted at the time of carrying-in and carrying-out the substrates 10 can be secured.

Figure 7:
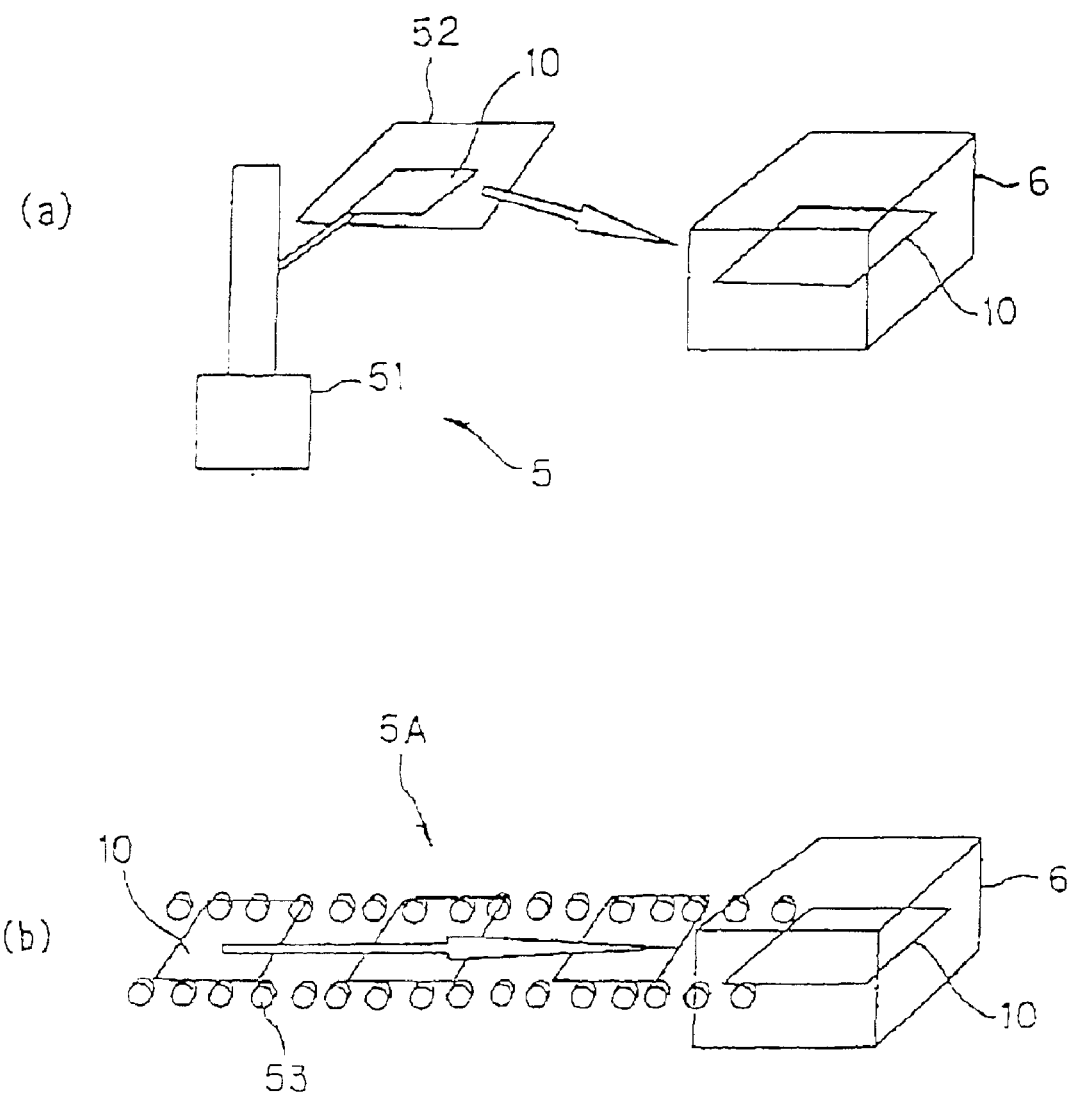
FIGS. 7(a)–7(b) schematically show the transfer units for discharging the substrate irradiated with the ultraviolet radiation in the UV irradiating part in one embodiment of the apparatus for manufacturing the liquid crystal panel of the invention.

FIG. 7 shows illustrations schematically showing transfer units for discharging the substrate 10 irradiated with the ultraviolet radiation in the UV irradiating part 40 (see FIG. 4). FIG. 7(a) illustrates a transfer unit 5 using a robot, and FIG. 7(b) illustrates a roller conveyer type transfer unit 5A. In the transfer unit 5 shown in FIG. 7(a), a robot 51 is used to house the substrates 10 on a rack 52 one by one. The substrate 10 housed on the rack 52 is moved to the cleaning part 6 as a unit of the rack 52 and is cleaned as the units of the racks 52 (by batch process). In the transfer unit 5A shown in FIG. 7(b), rollers 53 arranged along the transfer direction of the substrates 10 sequentially transfer the substrates 10 toward the cleaning part 6. In this case, the substrates 10 are transferred inside the cleaning part 6 one by one and are cleaned sequentially. When the substrates 10 are transferred to the cleaning part 6 one by one as shown in FIG. 7(b), the cleaning part 6 can be incorporated as a part of the liquid crystal panel fabricating apparatus.

As shown in FIG. 4, the liquid crystal panel 10 placed on the bringing-in part 50 is configured so that the transfer unit (not shown) leads it to the rubbing part 30. As the transfer unit, the same transfer unit as those shown in FIGS. 6(a) to 6(c) can be used. This transfer unit may be shared with an apparatus (not shown) for transferring the substrates inside the rubbing part 30 or the transfer unit may be shared in the transfer path from the bringing-in part 50 to the UV irradiating part 40 or to cleaning part 6.

Next, one embodiment of the method for manufacturing the liquid crystal panel of the invention will be described with reference to FIG. 8.

Figure 8:
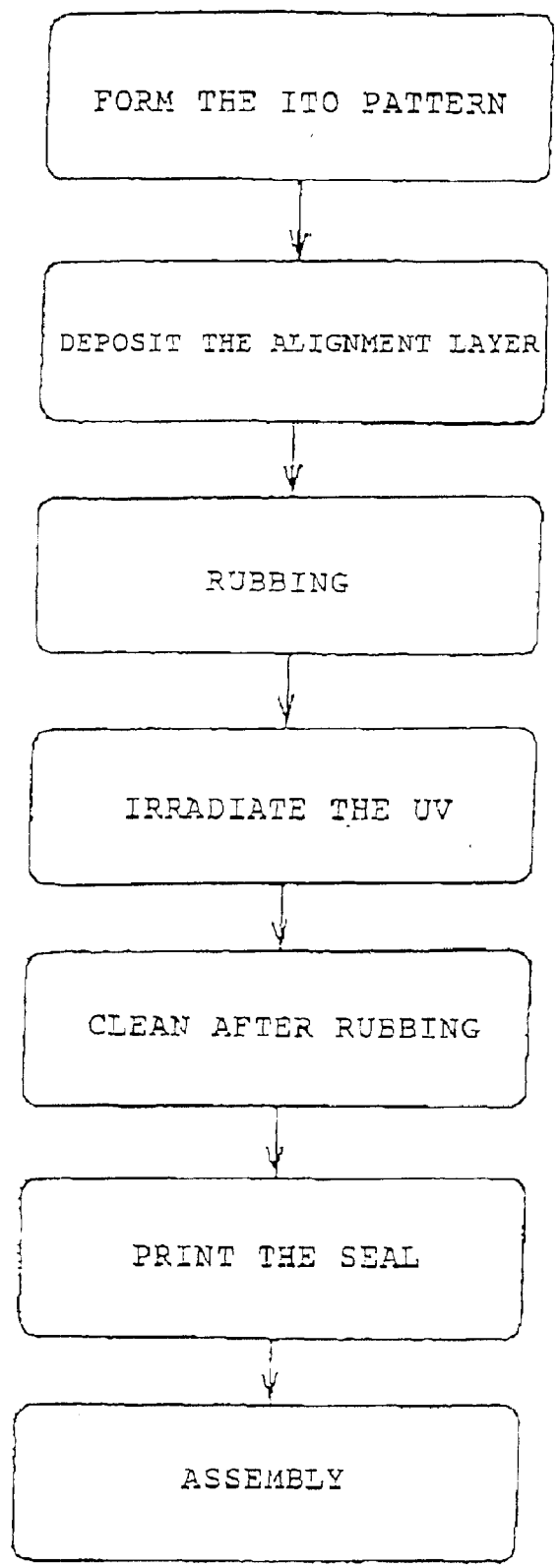
FIG. 8 is a process diagram schematically showing the manufacturing steps in one embodiment of the apparatus for manufacturing the liquid crystal panel of the invention.

FIG. 8 shows a process diagram schematically illustrating manufacturing steps in the embodiment of the method for manufacturing the liquid crystal panel of the invention.

As shown in FIG. 8, after an ITO electrode pattern is formed on the surface of the substrate 10 (see FIG. 4) (an ITO electrode pattern forming step), an alignment layer is deposited on the ITO electrode pattern using screen printing, letterpress printing or the like (an alignment layer depositing step). As the alignment layer material, polyimide and the like can be used. Additionally, after the ITO electrode pattern is formed, an insulating film is deposited on the ITO electrode pattern and the alignment layer may be deposited on the insulating film.

Then, as shown in FIG. 8 with reference to FIG. 4, the substrate 10 deposited with the alignment layer is placed on the bringing-in part 50 of the liquid crystal panel manufacturing apparatus 200 shown in FIG. 4. The substrate 10 placed on the bringing-in part 50 is introduced into the rubbing part 30 by the transfer unit described above. In the rubbing part 30, a rubbing process is performed to the alignment layer on the substrate 10 (a rubbing step). Thereby, the alignment direction of liquid crystals to be sealed inside the liquid crystal panel can be controlled. Additionally, as the rubbing process, generally used processing methods can be used.

Subsequently, the substrate 10 is transferred to the UV irradiating part 40 to irradiate the ultraviolet radiation on the alignment layer (a UV irradiating step). After that, the substrates 10 are sequentially housed on the rack 52 or are transferred to the cleaning part 6 one by one (see FIG. 7).

Then, the substrates 10 are ultrasonic-cleaned with pure water in the cleaning part 6 (a post-rubbing cleaning step). At this step, foreign matters such as fibers of cloth attached on the alignment layer surface at the rubbing step are removed at this step. In the embodiment, the alignment layer is ultrasonic-cleaned after the ultraviolet radiation have been irradiated onto the alignment layer. Therefore, the wettability of the alignment layer is improved and the cleaning effect can be enhanced. The effect of ultraviolet radiation irradiation will be described later.

After the alignment layer is cleaned and the substrates 10 are dried, seal printing is preformed (a seal printing step). In seal printing, the seal material is coated to the substrate 10 or a substrate (mother substrate) to be combined with the substrate 10 in a shape to match the shape of each of the liquid crystal panels.

Subsequently, after a pair of substrates (mother substrates) described above has been sealed with the seal material, it is cut into stripes. Then, after liquid crystals are injected and sealed between the pair of substrates, it is cut into discrete liquid crystal panels. Thereby, the liquid crystal panels can be fabricated (an assembling step).

Relationships between the amount of ultraviolet radiation irradiation after the rubbing process and a period of time to stand after ultraviolet radiation irradiation until cleaning with respect to the cleaning effect by ultraviolet radiation irradiation are shown in table 1 (the case of 254 nm of an ultraviolet radiation wavelength) and table 2 (the case of 365 nm of an ultraviolet radiation wavelength).

| UV Irradiation Amount, Time to Stand and Effect | | | | | | | |
|---|---|---|---|---|---|---|---|
| | UV Irradiation Amount (mJ/cm²) | | | | | | |
| Time to Stand | 75 | 150 | 300 | 450 | 600 | 900 | 1050 |
| 5 Minutes | ○ | ○○ | ○○ | ○○ | ○○ | ○○ | ○○ |
| 10 Minutes | Δ | ○ | ○○ | ○○ | ○○ | ○○ | ○○ |
| 20 Minutes | X | Δ | ○ | ○○ | ○○ | ○○ | ○○ |
| 30 Minutes | X | X | ○ | ○ | ○○ | ○○ | ○○ |
| 45 Minutes | X | X | Δ | ○ | ○ | ○○ | ○○ |
| 60 Minutes | X | X | X | Δ | ○ | ○○ | ○○ |
| 90 Minutes | X | X | X | X | Δ | ○ | ○ |
| 120 Minutes | X | X | X | X | X | ○ | ○ |
| 240 Minutes | X | X | X | X | X | X | X |

*The irradiation amount is represented by a wavelength of 254 nm.

Evaluation:

○○ denotes the condition that there is no spot-like wettability defect on the surface of the substrate when the substrate cleaned after rubbing is confirmed by a method (condition 1);

○ denotes the condition that there are less than ten spot-like wettability defects on the surface of the substrate when the substrate cleaned after rubbing is confirmed by a method (condition 2);

Δ denotes the condition that ten or more spot-like wettability defects are confirmed but not cause failure when a panel is formed (condition 3); and X denotes the defective condition when the panel is lit (condition 4).

UV Irradiation Amount, Time to Stand and Effect

| | UV Irradiation Amount (mJ/cm²) | | | | | | |
|---|---|---|---|---|---|---|---|
| Time to Stand | 250 | 500 | 1000 | 1500 | 2000 | 3000 | 3500 |
| 5 Minutes | ○ | ○○ | ○○ | ○○ | ○○ | ○○ | ○○ |
| 10 Minutes | Δ | ○ | ○○ | ○○ | ○○ | ○○ | ○○ |
| 20 Minutes | X | Δ | ○ | ○○ | ○○ | ○○ | ○○ |
| 30 Minutes | X | X | ○ | ○ | ○○ | ○○ | ○○ |
| 45 Minutes | X | X | Δ | ○ | ○ | ○○ | ○○ |
| 60 Minutes | X | X | X | Δ | ○ | ○○ | ○○ |
| 90 Minutes | X | X | X | X | Δ | ○ | ○ |
| 120 Minutes | X | X | X | X | X | ○ | ○ |
| 240 Minutes | X | X | X | X | X | X | X |

*The irradiation amount is represented by a wavelength of 365 nm.

Evaluation:

○○ denotes the condition that there is no spot-like wettability defect on the surface of the substrate when the substrate cleaned after rubbing is confirmed by a method (condition 1);

○ denotes the condition that there are less than ten spot-like wettability defects on the surface of the substrate when the substrate cleaned after rubbing is confirmed by a method (condition 2);

Δ denotes the condition that ten or more spot-like wettability defects are confirmed but not cause failure when a panel is formed (condition 3); and X denotes the defective condition when the panel is lit (condition 4).

The cleaning results are evaluated at four grades; the best condition is the condition that there is no spot-like wettablity defect on the surface of the substrate cleaned after rubbing (condition 1: indicated by ○○ in the table), the second best condition is the condition that there are less than ten spot-like wettablity defects on the surface of the substrate cleaned after rubbing (condition 2: indicated by ○ in the table), the third best condition is the condition that ten or more spot-like wettablity defects are confirmed but they are not defects when the panel is lit (condition 3: indicated by Δ in the table), and the worst condition is the condition that defects are generated when the panel is lit (condition 4: indicated by x in the table).

As apparent from table 1, in the case where the time to stand is set to five minutes when the ultraviolet radiation wavelength is 254 nm, it becomes condition 2 at the irradiation amount of 75 mJ/cm² but condition 1 at the irradiation amount of 150 mJ/cm² or greater. In the case where the time to stand is set to ten minutes, it becomes condition 3 at the irradiation amount of 75 mJ/cm², condition 2 at the irradiation amount of 150 mJ/cm², and condition 1 at the irradiation amount of 300 mJ/cm² or greater. In the case where the time to stand is set to 20 minutes, it becomes condition 4 at the irradiation amount of 75 mJ/cm², condition 3 at the irradiation amount of 150 mJ/cm², condition 2 at the irradiation amount of 300 mJ/cm², and condition 1 at the irradiation amount of 450 mJ/cm² or greater. In the case where the time to stand is set to 30 minutes, it becomes condition 4 at the irradiation amount of 150 mJ/cm² or below, condition 2 at the irradiation amounts of 300 mJ/cm² and 450 mJ/cm², and condition 1 at the irradiation amount of 600 mJ/cm² or greater. In the case where the time to stand is set to 45 minutes, it becomes condition 4 at the irradiation amount of 150 mJ/cm² or below, condition 3 at the irradiation amount of 300 mJ/cm², condition 2 at the irradiation amounts of 450 mJ/cm² and 600 mJ/cm², and condition 1 at the irradiation amount of 900 mJ/cm² or greater. In the case where the time to stand is set to 60 minutes, it becomes condition 4 at the irradiation amount of 300 mJ/cm² or below, condition 3 at the irradiation amount of 450 mJ/cm², condition 2 at the irradiation amount of 600 mJ/cm², and condition 1 at the irradiation amount of 900 mJ/cm² or greater. In the case where the time to stand is set to 90 minutes, it becomes condition 4 at the irradiation amount of 450 mJ/cm² or below, condition 3 at the irradiation amounts of 600 mJ/cm², and condition 2 at the irradiation amount of 900 mJ/cm² or greater. In the case where the time to stand is set to 120 minutes, it becomes condition 4 at the irradiation amount of 600 mJ/cm² or below, and condition 3 at the irradiation amount of 900 mJ/cm² or greater. In the case where the time to stand is set to 240 minutes, it becomes condition 4 at all the irradiation amounts.

In this manner, when the time to stand is set shorter, even with a smaller amount of ultraviolet radiation irradiation, a sufficient cleaning effect can be obtained a sufficient cleaning effect. However, the amount of ultraviolet radiation irradiation needs to be increased as the time to stand is prolonged. Furthermore, when the time to stand is set to 90 minutes or longer, it does not become condition 1 even though the amount of ultraviolet radiation irradiation is increased and a sufficient cleaning effect cannot be obtained. Accordingly, the time to stand is preferably set to within 60 minutes.

For example, in the case where the time to stand is needed for about 30 to 45 minutes due to overhead time that is generated when the post-rubbing cleaning step is set to batch process, the cleaned condition always becomes condition 1 in case where the irradiation amount is set to 900 mJ/cm². Additionally, when the cleaning step is combined as a sequential single-substrate line as interlocked with the ultraviolet radiation irradiating step, the cleaned condition is always made condition 1 even at the irradiation amount of 150 mJ/cm² in case where the time to stand can be set to within five minutes, for example.

As clearly seen from table 2, in the case where the time to stand is set to five minutes when the ultraviolet radiation wavelength is 365 nm, it becomes condition 2 at the irradiation amount of 250 mJ/cm², but it becomes condition 1 at the irradiation amount of 500 mJ/cm² or greater. When the time to stand is set to ten minutes, it becomes condition 3 at the irradiation amount of 250 mJ/cm², condition 2 at the irradiation amount of 500 mJ/cm², and condition 1 at the irradiation amount of 1000 mJ/cm² or greater. When the time to stand is set to 20 minutes, it becomes condition 4 at the irradiation amount of 250 mJ/cm², condition 3 at the irradiation amount of 500 mJ/cm², condition 2 at the irradiation amount of 1000 mJ/cm², and condition 1 at the irradiation amount of 1500 mJ/cm² or greater. When the time to stand is set to 30 minutes, it becomes condition 4 at the irradiation amount of 500 mJ/cm² or below, condition 2 at the irradiation amounts of 1000 mJ/cm² and 1500 mJ/cm², and condition 1 at the irradiation amount of 2000 mJ/cm² or greater. When the time to stand is set to 45 minutes, it becomes condition 4 at the irradiation amount of 500 mJ/cm² or below, condition 3 at the irradiation amount of 1000 mJ/cm², condition 2 at the irradiation amounts of 1500 mJ/cm² and 2000 mJ/cm², and condition 1 at the irradiation amount of 3000 mJ/cm² or greater. When the time to stand is set to 60 minutes, it becomes condition 4 at the irradiation amount of 1000 mJ/cm² or below, condition 3 at the irradiation amount of 1500 mJ/cm², condition 2 at the irradiation amount of 2000 mJ/cm², and condition 1 at the irradiation amount of 3000 mJ/cm² or greater. When the time to stand is set to 90 minutes, it becomes condition 4 at the irradiation amount of 1500 mJ/cm² or below, condition 3 at the irradiation amount of 2000 mJ/cm², and condition 2 at the irradiation amount of 3000 mJ/cm² or greater. When the time to stand is set to 120 minutes, it becomes condition 4 at the irradiation amount of 2000 mJ/cm² or below, and condition 3 at the irradiation amount of 3000 mJ/cm² or greater. When the time to stand is set to 240 minutes, it becomes condition 4 at all the irradiation amounts.

In this manner, when the time to stand is set shorter, even with a smaller ultraviolet radiation irradiation amount, a sufficient cleaning effect can be obtained. However, the ultraviolet radiation irradiation amount needs to be increased as the time to stand is prolonged. Besides, when the time to stand is set to 90 minutes or greater, it does not become condition 1 even though the ultraviolet radiation irradiation amount is increased and a sufficient cleaning effect cannot be obtained. Accordingly, the time to stand is preferably set within 60 minutes.

For example, in the case where the time to stand is needed for about 30 to 45 minutes due to overhead time that is generated when the post-rubbing cleaning step is set to batch process, the cleaned condition always becomes condition 1 in case where the irradiation amount is set to 3000 mJ/cm² or greater. Additionally, when the cleaning step is combined as a sequential single-substrate line as interlocked with the ultraviolet radiation irradiating step, the cleaned condition can be made condition 1 even at the irradiation amount of 500 mJ/cm² in case where the time to stand can be set to within five minutes, for example.

As described above, the invention can provide the method and the apparatus for manufacturing the electro-optical device capable of uniformly depositing the insulating film or alignment layer and the method and the apparatus for manufacturing the liquid crystal panel capable of efficiently cleaning the alignment layer. The entire disclosures of Japanese Patent Application nos. 2000-270437, 2000-300928, 2000-317082, and 2001-212082 are incorporated herein by reference.

What is claimed is:

1. A method for fabricating an electro-optical device comprising the steps of:
   providing a glass substrate;
   forming an electrode pattern of ITO on a surface of said substrate;
   cleaning said surface of said substrate including said electrode pattern with ultrasonic waves and water after forming said electrode pattern;
   forming a coupling layer on said surface of said substrate after cleaning said surface of said substrate;
   irradiating ultraviolet radiation onto a surface of said coupling layer after forming said coupling layer;
   depositing an insulating film consisting of an inorganic oxide on said coupling layer irradiated with the ultraviolet radiation after irradiating said surface of said coupling layer;
   depositing an alignment layer on said insulating film after depositing said insulating film on said coupling layer;
   applying a rubbing process to a surface of said alignment layer after depositing said alignment layer;
   irradiating said surface of said alignment layer with ultraviolet radiation after applying said rubbing process to said alignment layer to increase wettability of said alignment layer; and
   ultrasonically cleaning said alignment layer with pure water after irradiating said alignment layer.

2. A method for fabricating the electro-optical device according to claim 1, wherein the inorganic oxide of the insulating film is selected from the group consisting of $SiO_2$, $ZnO$, $ZrO_2$, and $Sb_2O_5$.

3. A method for fabricating an electro-optical device, the method comprising:
   a first step of irradiating ultraviolet radiation onto a substrate;
   a second step following the first step of depositing an insulating film on a surface of the substrate that was irradiated with ultraviolet radiation;
   a third step following the second step, of depositing an alignment layer on the insulating film;
   a fourth step following the third step of irradiating a surface of the alignment layer with ultraviolet radiation after applying a rubbing process to the alignment layer; and
   a fifth step following the fourth step of cleaning the alignment layer.

4. A method for fabricating the electro-optical device according to claim 3, the insulating film consisting of an inorganic oxide.

5. A method for fabricating an electro-optical device according to claim 3, further comprising forming an ITO electrode pattern on the substrate before irradiating ultraviolet radiation onto the substrate.

* * * * *